United States Patent [19]
Whitley, II

[11] Patent Number: 5,762,093
[45] Date of Patent: Jun. 9, 1998

[54] FUEL OVERFLOW RESTRICTOR/WATER INTAKE RESTRAINING DEVICES

[75] Inventor: Warwick M. Whitley, II, Lynn Haven, Fla.

[73] Assignee: Attwood Corporation, Lowell, Mich.

[21] Appl. No.: 412,979

[22] Filed: Mar. 29, 1995

[51] Int. Cl.$^6$ ........................................ F16K 24/04
[52] U.S. Cl. .................. 137/199; 137/202; 137/513.7; 137/519.5; 137/587
[58] Field of Search .......................... 137/199, 202, 137/513.7, 519.5, 587

[56] References Cited

U.S. PATENT DOCUMENTS

| | | |
|---|---|---|
| 7,794 | 11/1850 | Bulkley . |
| 672,415 | 4/1901 | Dodge . |
| 845,500 | 2/1907 | Wilson . |
| 851,999 | 4/1907 | Skellenger . |
| 852,007 | 4/1907 | Wilson . |
| 879,029 | 2/1908 | Blackburn . |
| 950,533 | 3/1910 | Hilliard . |
| 954,178 | 4/1910 | Fowler . |
| 1,476,618 | 12/1923 | Jones . |
| 1,724,878 | 8/1929 | Jensen . |
| 1,788,358 | 1/1931 | Goerg . |
| 1,851,084 | 3/1932 | Brown et al. . |
| 2,309,839 | 2/1943 | Gardner . |
| 2,310,636 | 2/1943 | Howard . |
| 2,388,481 | 11/1945 | Green ........................ 137/202 |
| 2,495,905 | 1/1950 | Pogue . |
| 2,576,687 | 11/1951 | Krehbiel . |
| 2,853,092 | 9/1958 | Klikunas ..................... 137/202 |
| 2,919,707 | 1/1960 | Seidler . |
| 3,081,730 | 3/1963 | Dvorachek . |

(List continued on next page.)

FOREIGN PATENT DOCUMENTS

| | | |
|---|---|---|
| 750018 | 4/1933 | France . |
| 950251 | 4/1956 | Germany . |
| 2109980 | 9/1972 | Germany . |
| 2553865 | 5/1977 | Germany . |
| 55-24258 | 2/1980 | Japan . |
| 55-97570 | 7/1980 | Japan . |
| 15027 | of 1908 | United Kingdom . |
| 253696 | 6/1926 | United Kingdom . |
| 623348 | 5/1949 | United Kingdom . |

OTHER PUBLICATIONS

U.S. Statutory Invention Registration No. H438 (Mar. 1, 1988).

Exhibit A (3 photographs of a wood and plastic mock-up of a fuel overflow restrictor shown to boat manufacturers more than one year prior to filing of the present Application).

*Primary Examiner*—Gerald A. Michalsky
*Attorney, Agent, or Firm*—Price,Heleveld,Cooper, Dewitt & Litton

[57] ABSTRACT

A compact, lightweight, inexpensive surge restrictor for use in the fuel tank vent line of a marine craft includes a housing which defines a chamber having an inlet and an outlet, a baffle member disposed within a flow path through the chamber so that liquid passing therethrough impinges upon and is redirected to dissipate liquid momentum, and a movable closure member, which in response to a surge of liquid into the inlet, abates liquid flow through the surge restrictor. More specifically, the movable closure member is movable between a normal rest position wherein vapor and air can easily flow through the surge restrictor to allow venting and atmospheric pressure equalization within a fuel tank, and a liquid fuel surge arresting position wherein the closure member blocks a passageway in the flow path between the inlet and outlet of the surge restrictor to abate fluid flow therethrough. Preferably, small openings allow continuous air/fuel vapor flow even when the movable closure is in its fuel arresting position. On form of the device also provides a combined surge restrictor and water ingestion restrictor. The surge restrictor of the invention provides a simple device for effectively preventing discharge of liquid fuel into the environment on account of fuel surges which can, for example, be caused by overfilling of the fuel tank or by rocking of the marine craft due to wave action.

22 Claims, 4 Drawing Sheets

U.S. PATENT DOCUMENTS

| | | |
|---|---|---|
| 3,115,114 | 12/1963 | Rapplean et al. . |
| 3,140,794 | 7/1964 | Arndt et al. . |
| 3,152,604 | 10/1964 | Frye et al. ............................... 137/202 |
| 3,286,873 | 11/1966 | Tuckey . |
| 3,367,362 | 2/1968 | Hoffman . |
| 3,502,047 | 3/1970 | Crosbie . |
| 3,520,330 | 7/1970 | Szwargulski . |
| 3,530,882 | 9/1970 | Case . |
| 3,561,472 | 2/1971 | Lamb et al. . |
| 3,614,960 | 10/1971 | Pfrengle . |
| 3,620,240 | 11/1971 | Bogdanski . |
| 3,650,256 | 3/1972 | Marshall . |
| 3,685,504 | 8/1972 | Torazza . |
| 3,687,335 | 8/1972 | Hunter . |
| 3,698,160 | 10/1972 | Hunter . |
| 3,727,635 | 4/1973 | Todd . |
| 3,738,384 | 6/1973 | Hall . |
| 3,746,263 | 7/1973 | Reeder et al. . |
| 3,770,001 | 11/1973 | Davis . |
| 3,771,690 | 11/1973 | Hunter . |
| 3,776,256 | 12/1973 | Marshall . |
| 3,786,829 | 1/1974 | Nardo et al. ............................. 137/202 |
| 3,830,252 | 8/1974 | Follett . |
| 3,841,349 | 10/1974 | Todd . |
| 3,858,603 | 1/1975 | Lenz . |
| 3,861,415 | 1/1975 | Larsen . |
| 3,869,967 | 3/1975 | Lenz . |
| 3,901,475 | 8/1975 | Dreibelbis . |
| 3,910,302 | 10/1975 | Sudhir . |
| 3,924,559 | 12/1975 | Renner, Jr. et al. . |
| 3,983,891 | 10/1976 | Shoemaker . |
| 3,996,951 | 12/1976 | Parr et al. . |
| 4,007,759 | 2/1977 | Martin et al. . |
| 4,030,520 | 6/1977 | Sands . |
| 4,050,471 | 9/1977 | Anhegger et al. . |
| 4,068,680 | 1/1978 | Sliger . |
| 4,082,125 | 4/1978 | Wilson et al. . |
| 4,091,849 | 5/1978 | Stevenson . |
| 4,094,346 | 6/1978 | Milo . |
| 4,095,609 | 6/1978 | Martin . |
| 4,104,004 | 8/1978 | Graef . |
| 4,142,470 | 3/1979 | Zauss . |
| 4,143,672 | 3/1979 | West . |
| 4,171,712 | 10/1979 | DeForrest . |
| 4,241,645 | 12/1980 | le Comte . |
| 4,319,693 | 3/1982 | Hashimoto et al. . |
| 4,325,398 | 4/1982 | Green . |
| 4,457,325 | 7/1984 | Green . |
| 4,487,215 | 12/1984 | Green . |
| 4,489,744 | 12/1984 | Merrill . |
| 4,518,363 | 5/1985 | Bland et al. . |
| 4,535,715 | 8/1985 | McIntosh . |
| 4,581,022 | 4/1986 | Schupp . |
| 4,583,536 | 4/1986 | Jan . |
| 4,589,852 | 5/1986 | Price . |
| 4,630,749 | 12/1986 | Armstrong et al. . |
| 4,633,681 | 1/1987 | Webber . |
| 4,640,304 | 2/1987 | Looney . |
| 4,666,058 | 5/1987 | Harris . |
| 4,677,929 | 7/1987 | Harris . |
| 4,706,840 | 11/1987 | Thompson . |
| 4,760,858 | 8/1988 | Szlaga . |
| 4,769,050 | 9/1988 | Shaw et al. . |
| 4,785,484 | 11/1988 | Sargent . |
| 4,805,660 | 2/1989 | Antos et al. . |
| 4,807,656 | 2/1989 | Ito . |
| 4,811,756 | 3/1989 | Hall . |
| 4,825,897 | 5/1989 | Shade . |
| 4,825,905 | 5/1989 | Whitley, II . |
| 4,846,208 | 7/1989 | Hempel et al. . |
| 4,854,469 | 8/1989 | Hargest . |
| 4,877,152 | 10/1989 | Whitley, II . |
| 4,886,089 | 12/1989 | Gabrlik et al. . |
| 4,893,643 | 1/1990 | Gifford et al. . |
| 4,917,795 | 4/1990 | Sable et al. . |
| 4,944,327 | 7/1990 | Gyben . |
| 4,945,947 | 8/1990 | Westra et al. . |
| 4,963,169 | 10/1990 | Granville . |
| 4,982,757 | 1/1991 | Ohasi et al. . |
| 4,989,629 | 2/1991 | Shirkawa . |
| 5,019,141 | 5/1991 | Granville et al. . |
| 5,023,608 | 6/1991 | Desisle, Jr. et al. . |
| 5,035,729 | 7/1991 | Hodgkins . |
| 5,042,519 | 8/1991 | Kerlin . |
| 5,044,389 | 9/1991 | Gimby . |
| 5,046,526 | 9/1991 | Longmore et al. . |
| 5,054,508 | 10/1991 | Benjey . |
| 5,062,444 | 11/1991 | Bergsma . |
| 5,088,947 | 2/1992 | Whitley, II et al. . |
| 5,101,852 | 4/1992 | Magnasco . |
| 5,115,830 | 5/1992 | Harde . |
| 5,181,497 | 1/1993 | Matsushita et al. . |
| 5,189,877 | 3/1993 | Wells et al. . |
| 5,229,766 | 7/1993 | Hargest . |
| 5,230,372 | 7/1993 | Westphal . |
| 5,247,958 | 9/1993 | Deparis et al. . |
| 5,251,111 | 10/1993 | Nagengast et al. . |
| 5,253,668 | 10/1993 | Mills . |
| 5,273,466 | 12/1993 | Thompson . |
| 5,386,843 | 2/1995 | Church ..................................... 137/202 |
| 5,435,335 | 7/1995 | Klop ......................................... 137/202 |

FUEL OVERFLOW RESTRICTOR/WATER INTAKE RESTRAINING DEVICES

This invention relates to a device for restricting the flow of liquid fuel from the fuel tank of a marine craft through the fuel vent line, and more particularly to a marine fuel tank vent line overflow restrictor which will suppress liquid fuel surges from the fuel tank, caused for example by overfilling or wave action, and prevent discharge of fuel overboard into the environment, while allowing continuous venting of fuel vapor during normal operation to maintain safe pressures in the fuel tank. One form of the invention will also restrict ingestion of water into the fuel tank from outside the craft.

BACKGROUND OF THE INVENTION

Motorized marine craft generally employ a hull-mounted fuel tank having a fill line to enable filling of the tank with liquid fuel. The fill line is generally sealed off with a fuel cap, except during fueling, to prevent contaminants from entering into the fuel tank and to prevent fuel from escaping. In order to maintain ambient atmospheric pressure in the tank, a vent line open to the atmosphere is installed at the top of the fuel tank to allow air and fuel vapor to exit to the atmosphere during fueling or when the fuel expands and vaporizes because of a rise in temperature, and to allow air to be drawn into the tank when fuel is being withdrawn from the tank to power the engine, thus allowing fuel to be added to the tank or removed therefrom without encountering positive or negative pressure resistances, and preventing dangerously high pressures from building up in the fuel tank due to vaporization and thermal expansion of the fuel.

In order to comply with government regulations and current industry standards, fuel vent lines on marine craft are generally provided with a fuel vent line separator or restrictor which prevents liquid fuel from being discharged overboard into the environment due to overfilling of the fuel tank or because of violent wave action, which can cause liquid fuel to surge into the fuel vent line.

Several known devices have been employed to restrict liquid fuel surges caused by over filling and/or by rocking of marine craft due to wave action while allowing venting of excess fuel vapor and atmospheric pressure equalization. These known devices are generally bulky, complicated vent line separators having a plurality of moving parts.

An example of a known device for suppressing liquid fuel surges to prevent discharge of liquid overboard into the environment is shown and described in U.S. Pat. No. 5,019,141. This known device includes a housing defining a chamber, and an umbrella-shaped diverter which downwardly redirects liquid fuel flowing upwardly through a riser tube which is in fluid communication with the headspace of a fuel tank. In the event of a liquid fuel surge of sufficient magnitude to cause the lower compartment to fill with liquid fuel, the liquid flows upwardly between a small circumferential gap between the interior wall of the chamber and the perimeter of the umbrella-shaped diverter, causing an upper chamber to fill with liquid. The rising liquid fuel can eventually come in contact with a buoyant ball check which floats on top of the liquid. As the ball check rises, it engages a movable seat which is urged downwardly by a helical compression spring. When the ball check first engages the movable seat, the outlet becomes closed off, which prevents liquid and vapor from being vented to the atmosphere. Accordingly, continuous venting is not necessarily maintained during a liquid fuel surge. When a predetermined pressure is exceeded, the compression spring yields to allow the seat to move upwardly to a position wherein liquid or vapors can flow past the seat and vent to the atmosphere. This device has a plurality of moving parts including a buoyant ball check, a movable seat, a compression spring, and a moving O-ring, all of which are highly susceptible to failure in the event of excessive wear. The device is also relatively bulky and potentially heavy in the event that it should become filled with liquid, and thus requires special mounting considerations as set forth in the patent document. Because of its complexity, it is relatively expensive to manufacture.

Accordingly, a compact, lightweight, simple, inexpensive device having a single moving part, and which is capable of effectively preventing discharge of liquid fuel through the fuel vent line, but which allows continuous venting and atmospheric pressure equalization during liquid fuel surges into the fuel vent line would be highly desirable.

SUMMARY OF THE INVENTION

The fuel vent line overflow restrictor of the invention provides a device which quickly and effectively arrests liquid fuel surges through a vent line to prevent discharge of liquid fuel overboard into the environment, and which normally allows venting and atmospheric pressure equalization within the fuel tank. The restrictor is relatively simple, compact, lightweight, inexpensive, and easily installed as compared with known devices for achieving similar results.

The overflow restrictors of the invention include a housing defining a chamber having an inlet and an outlet, a baffle member having a liquid flow diverting surface, which causes liquid fuel surging from the fuel tank into the restrictor to dissipate momentum, and a moveable closure member which, in response to a surge of liquid into the inlet of the restrictor, substantially blocks the flow of liquid through the restrictor. The restrictor relies on a single moving part to arrest liquid fuel surges from the fuel tank through the vent line, and prevent liquid fuel from being discharged overboard and polluting the environment.

The movable closure can be generally any means which will move from a normal rest position in response to a liquid surge through the overflow restrictor to a second position wherein the closure blocks the normal flow path through the restrictor to abate flow of liquid through the restrictor, and then move back to the normal rest position after the surge has been arrested. Examples of suitable closures can include any of various hinged flap valves or hinged doors which, for example, can cooperate with an opening in a baffle, between baffles, or between a baffle and the interior walls of the restrictor. More preferably, the closure means are ball checks or other similar objects which can seat against and block an opening when urged to do so by the flow of liquid fuel into the inlet.

The movable closure means is normally seated in a rest position which places it in the flow path through the restrictor such that fluids flowing into the restrictor inlet must impinge upon the closure means. The closure means is movable to another position wherein it blocks the normal flow path to arrest the majority of flow through the restrictor when a sufficient amount of momentum is transferred to the closure means from the liquid surging into the restrictor inlet and impinging upon the closure means. The restrictor generally includes means for guiding the closure means between the rest position and the flow arresting or closure position such that fluids flowing into the restrictor always impinge upon the movable closure means.

In accordance with a referred aspect of the invention, restricted flow means are provided to allow venting, pressure relief, and atmospheric pressure equalization in the fuel tank at all times, even when the closure means is in the flow arresting or closure position.

In accordance with another aspect of the invention, a water intake constraining device is integrated into an overflow restrictor to provide a compact, dual function device which is easily mountable onto a hull opening without brackets or other special mounting hardware.

These and other features, objects, and benefits of the invention will be recognized by those who practice the invention and by those skilled in the art, from the specification, the claims, and the drawing figures.

DESCRIPTION OF THE PREFERRED EMBODIMENTS

The words "upper end", "lower end", "top end", "bottom end", and similar words as used herein to designate spacial relationships are to be interpreted with reference to their ordinary meaning and to the drawings. The word "inboard" as used herein means "relatively nearer to the center of the hull," and the word "outboard" as used herein means "relatively farther from the center of the hull." The word "fluid" as used herein refers to liquid, gases (air), and vapor.

Figure 1:
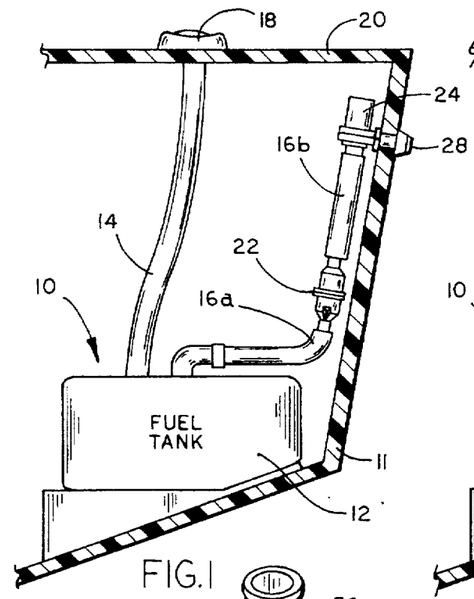
FIG. 1 is a side elevational and partial cross-sectional view of a marine craft showing a fuel system employing a fuel vent line having a fuel overflow restrictor and a conventional water intake constraining device.

Shown in FIG. 1 is a marine fuel system 10 including a conventional fuel tank 12 permanently mounted in a fixed position in a watercraft or boat having a hull 11, a filling line 14 through which fuel is added to the tank, and a fuel vent line 16 through which excess fuel vapor can be freely discharged and air can be freely drawn into or discharged from tank 12 to maintain ambient pressure in the headspace of the fuel tank at all times. The filling line 14 is generally sealed such as with a removable fuel cap 18 of conventional design, except when fuel is being added to the tank 12, to prevent water and other contaminants from entering into the fuel tank and to prevent liquid fuel from surging up through the filling line onto the deck 20 and/or into the water on account of wave action. In accordance with a first preferred embodiment, the fuel vent line 16 is provided with a fuel overflow restrictor 22 for preventing the discharge of liquid fuel through the fuel vent line and out into the environment while freely allowing atmospheric pressure equalization within the fuel tank 12 at all times.

Figure 1A:
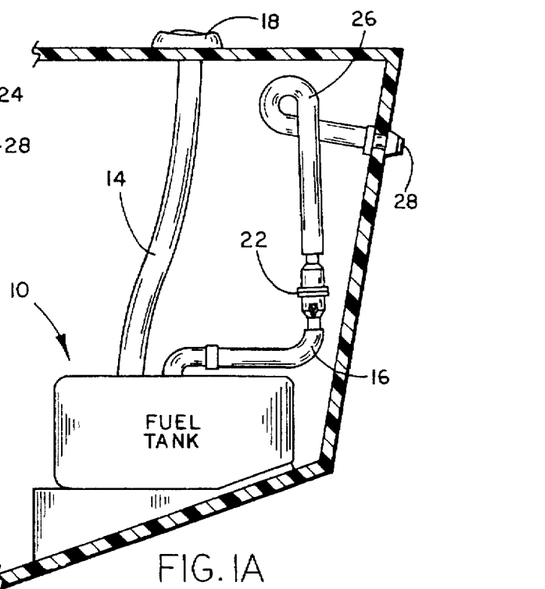
FIG. 1A is a side elevational and partial cross-sectional view of a marine craft showing a fuel system employing a fuel vent line having a fuel overflow restrictor and a looped tube for preventing water from entering the fuel tank through the vent line.

It is generally desirable and highly recommended that the fuel vent line 16 be provided with a device 24 for restraining the in-flow of water and for preventing other foreign material from entering the fuel vent line and contaminating the fuel in the tank 12. Suitable devices for restraining the in-flow of water and for preventing other foreign material from entering the fuel tank 12 through the fuel vent line 16 are commercially available. Examples of such devices such as that at 24 are shown and described in detail in commonly-owned U.S. Pat. Nos. 4,825,905; 4,877,152; and 5,088,947, all of which are hereby incorporated by reference herein. As an alternative, generally adequate protection against water ingestion or entry of other contaminants into the fuel tank can be achieved by merely providing a loop 26 (such as about a 270° loop) in the fuel vent line 16 as shown in FIG. 1A. The pipe, tube, or other conduit means between the loop 26 and the vent outlet 28 slopes downwardly away from the loop to prevent water or other contaminants from becoming trapped in the loop and plugging the vent line 16.

A preferred fuel overflow restrictor 22 will be described in further detail with reference to FIGS. 2–6. The overflow restrictor 22 includes a housing 30 having an upper housing half 58 and lower housing half 59 which, when assembled, define a generally cylindrically shaped interior chamber 32, an inlet opening 34 which is adapted to be connected with a vent hose/conduit means 16a in fluid communication with the headspace of fuel tank 12, and an outlet opening 36 which is adapted to be connected with vent hose/conduit means 16b in fluid communication with the atmosphere. The interior chamber 32 contains lower and upper partitions or baffles, 38 and 40 respectively, which together cause any fluids which are passing between the inlet 34 and outlet 36 to travel a tortuous, nonlinear flow path. The lower, annular shaped baffle plate 38 and upper, generally circular shaped baffle plate 40 are integral portions of a top-hat shaped baffle member or assembly 42 wherein the lower and upper baffle plates are maintained in spaced, parallel, concentric relationship by a slotted cylindrical wall 43. The circumferential edge 44 of the baffle member 42 fits snugly within a circumferential channel 45 on the inner wall of housing 30 so that fluid flowing through the overflow restrictor 22, past the lower baffle 38, must flow through the central opening 46 in the annular shaped lower baffle or through one of the two small orifices 50 in the lower baffle. The baffle member 38 divides the interior chamber 32 into a lower subchamber 52 and an upper subchamber 53. The lower subchamber 52 contains a spherical ball check 54 which normally rests on a lower seat 55 comprising four circumferentially spaced seat segments 56. Fluids such as air, fuel vapor, and even small quantities of liquid fuel can flow freely around the ball check 54 at the spaces 57 between the seat segments 56 (FIG. 4) when the check ball is in its normal position resting on the four segments 56 of the lower seat 55. In the normal rest position, the ball check 54 is vertically spaced below and away from the lower baffle 38 and above the upper end of inlet conduit 34. The ball check 54 is free to move upwardly and downwardly within the lower subchamber 52 between the seat segments 56 and the lower baffle 38.

Figure 2:
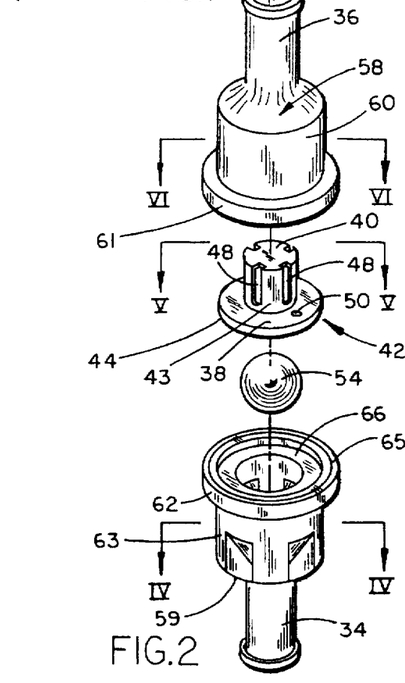
FIG. 2 is an exploded perspective view showing the various parts of a fuel overflow restrictor in accordance with a preferred embodiment of the invention.
Figure 3:
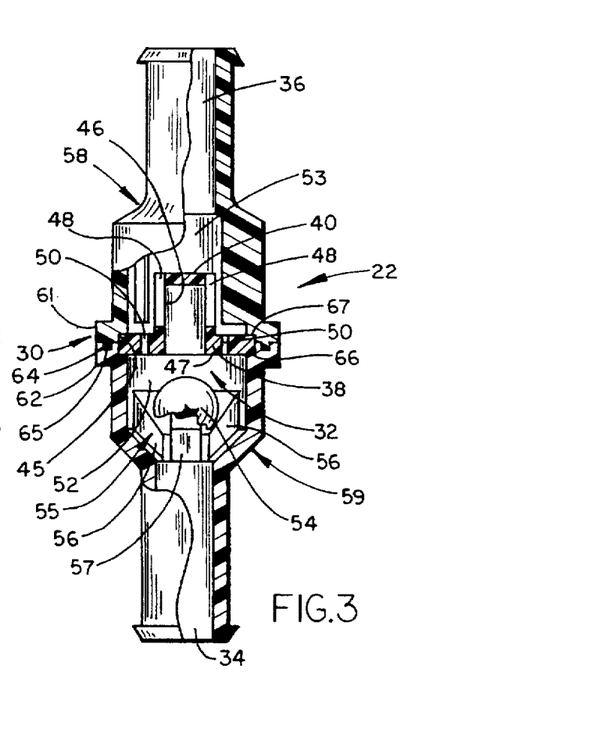
FIG. 3 is a partial side elevational and partial cross-sectional view of an assembled fuel overflow restrictor as shown in FIG. 2.

In operation, a sufficiently forceful surge of liquid fuel, as might occur during overfilling of the fuel tank 12 or by rocking of the marine craft caused by wave action or sharp turns or other sudden boat movements, will transfer enough momentum to the ball check 54 to cause it to move upwardly and engage the inner rim 47 of the central opening 46 in the lower baffle, closing off the central opening 46 so that fluid flow is temporarily restricted to and reduced by the orifices 50. Any liquid fuel which passes through the central opening 46 during the early stages of a liquid fuel surge before the opening 46 is blocked off by the ball check 54 must follow a tortuous, nonlinear path wherein the momentum of the upwardly moving liquid is effectively dissipated within the overflow restrictor 22. More specifically, liquid fuel rising upwardly during the early stages of a liquid fuel surge must first impinge upon the ball check 54 and change directions to flow around the check ball and through the spaces between the seat segments 56. The upwardly rising liquid then impinges upon the lower baffle 38, changes direction, and then passes through the opening 46 to continue moving upwardly. Each time the upwardly rising fluid impinges upon a baffle, the fluid is forced to change directions and loses momentum. Most of the liquid fuel that moves upwardly during a surge caused by wave action or by overfilling loses its upward momentum before entering the opening 46 and flows back down into the lower subchamber 52. Any liquid fuel which retains sufficient upward momentum to enter the opening 46 and flow upward along the inner surface of the slotted cylindrical wall 43 will impinge upon upper baffle 40, change direction again and be deflected laterally radially outwardly, and flow outwardly through the slots 48 in the cylindrical wall 43 of the baffle member 42, sacrificing substantially all of any remaining upward momentum. Substantially all of the upward momentum of any liquid which flows upwardly past ball check 54 and opening 46 is dissipated before liquid can rise upward past the upper baffle 40. Accordingly, the tortuous path imposed upon upwardly flowing liquid fuel by the ball check 54 and the baffle plates 38 and 40 effectively prevent any upwardly surging liquid fuel from moving upwardly and out from the outlet 36 of the overflow restrictor 22.

During the early stages of a liquid fuel surge, upward momentum is transferred from the liquid to the check ball 54 causing it to rise and eventually seat up against the inner rim 47 of the opening 46 to block off flow through the opening 46, severely restricting the upward flow of liquid fuel. The orifices 50 are of such small diameter that any upwardly moving liquid which enters the orifices from the lower subchamber 52 will lose most or substantially all of its upward momentum before it enters the upper subchamber 53. Examples of suitable diameters for the orifices 50 are from about 0.03 to about 0.05 inches. After the upward momentum of a liquid fuel surge has been dissipated, upward momentum is no longer transferred to the check ball 54 and it drops back into its normal rest position on seat segments 56, and any liquid fuel remaining in the overflow restrictor 22 drains out through inlet 34 and back into the fuel tank 12. Any small amounts of liquid fuel which may enter into the upper subchamber 53 can flow back into the fuel tank through orifices 50 or slots 48, and then downwardly through spaces 57 between ball seat segments 56.

While it is desirable to include orifices 50 in the lower baffle plate 38 to permit atmospheric pressure equalization, pressure relief and adequate venting of the fuel tank even during an upward surge of liquid fuel which causes ball check 54 to seat on and close off the opening 46 in baffle 38, and to facilitate better draining of liquid fuel from the upper subchamber 53 of the overflow restrictor 22, it should be understood that the orifices 50 are not absolutely essential, because liquid fuel surges are transient events wherein significant departures from atmospheric pressure in the fuel tank 12 are not likely to occur merely on account of the vent line 16 being completely closed off during a portion of the liquid fuel surge. Accordingly, the overflow restrictor 22 would perform adequately and have significant utility even without orifices 50. Further, it should be understood that any of various means other than orifices 50 can be employed to permit atmospheric pressure equalization in the fuel tank 12 at all times while severely restricting the flow of upwardly surging liquid. For example, notches could be provided on the inner rim 47 of the opening 46 in the lower baffle plate 38 so that the check ball, when seated on the inner rim 47 of the opening 46, does not completely block off flow through the opening 46, but instead allows restricted flow at the notches and, thus, allows for pressure relief, atmospheric pressure equalization in the fuel tank, and venting. It should also be understood that there is considerable latitude in the number and dimension of orifices, notches, or other means used to severely restrict liquid flow and allow atmospheric pressure equalization or venting when the check ball is seated on and blocking the opening 46.

Figures 4, 5, 6, 7, 8:
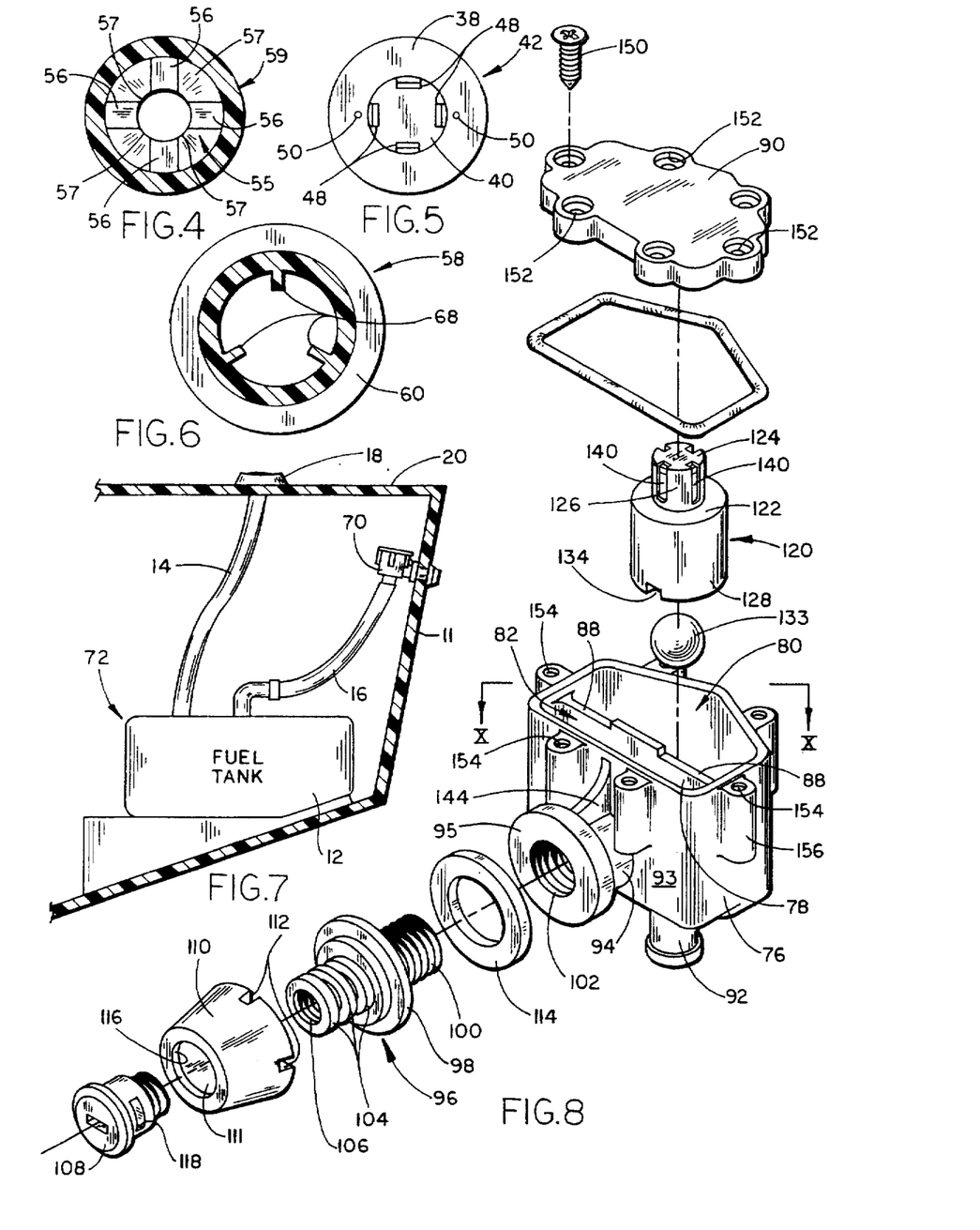
FIG. 4 is a cross-sectional view along lines IV—IV of FIG. 2.
FIG. 5 is a top plan view of the baffle plate member of the fuel overflow restrictor as viewed along lines V—V of FIG. 2.
FIG. 6 is a cross-sectional view along lines VI—VI of FIG. 2.
FIG. 7 is a side elevational and partial cross-sectional view of a fuel system employing another embodiment of the present invention including a combination fuel overflow restrictor and water intake constrainer device.
FIG. 8 is an exploded perspective view showing the various parts of the combination fuel overflow restrictor and water intake constrainer device of FIG. 7.

Separator 22 is preferably made by forming and assembling the four components shown in FIG. 2. The housing 30 is comprised of two separately formed halves 58 and 59 which are joined along a central seam to form the complete housing of the separator 22. The upper housing half 58 is comprised of a substantially cylindrical body 60 having a tapered section transitioning into a tubular outlet 36 at the upper end and having a flange 61 at its lower end which is adapted to mate with flange 62 on the lower housing half 59. More specifically, the face of flange 61 has a circumferential raised lip 64 (shown in FIG. 3) which fits into a circumferential groove 65 on the face of flange 62. The lower housing half 59 is comprised of a substantially cylindrical body 63 having a tapered section transitioning into a tubular inlet 34 at its lower end, and having the flange 62 at its upper end. The lower housing half 59 also has a recessed shoulder 66 inwardly adjacent to the flange 62, which supports the baffle member 42. The upper housing half 58 has a similar recessed shoulder 67 inwardly adjacent to the flange 60. The shoulders 66 and 67 cooperate to firmly secure the baffle member therebetween and prevent axial or radial movement upon assembly as shown in FIG. 3. The seat segments 56 are preferably an integrally formed portion of the lower housing half 59. As shown in FIG. 6, the upper housing half 58 is desirably provided with a plurality of circumferentially spaced apart ribs 68 which protrude radially inwardly from the inner wall of the generally cylindrical body 60. Ribs 68 act as locators to help properly position baffle member or assembly 42 during the assembly of the separator 22.

The upper and lower housing halves 58 and 59, and the baffle member or assembly 42 can be made from a variety of different materials, but are most preferably formed from durable thermoplastics such as polypropylene 20% glass filled using conventional molding techniques such as compression and injection molding. The ball check 54 can also be made from any of a variety of materials, but is most preferably made from resilient elastomeric materials such as nitrile rubber. The ball check 54 can be hollow or solid, and can have a composite or multiple layer structure, in which the outer exposed layer will most preferably be of a resilient elastomeric material. While it is conceivable that the fuel overflow restrictor 22 can be designed to utilize any of various ball checks having an apparent density (i.e., mass divided by displacement) which can vary over a broad range, the ball check 54 will desirably have an apparent density which is from about 1.1 to about 1.3 times the density of the liquid fuel at normal conditions (i.e., at normal atmospheric pressure and at about normal room temperature). That is, the ball check 54 is desirably non-buoyant in the liquid fuel, but of sufficiently low apparent density so that a liquid fuel surge that would be of sufficient force to cause fuel to be discharged into the environment if a separator is not present, will cause the ball check to move upwardly and seat against the opening 46.

Assembly of the fuel overflow restrictor 22 from the components shown in FIG. 2 can be achieved by positioning the ball check 54 in the lower subchamber 52 defined by the cylindrical body 63 of the lower housing half 59, fitting the baffle member or assembly onto the recess 66 of the lower housing half and thereby trapping the ball check within the lower subchamber, positioning the upper housing half 58 over the baffle member or assembly, sliding the upper housing half downwardly so that the flanges 61 and 62 are joined together with rib 64 inserted into groove 65, and thermally fusing the upper housing half to the lower housing half along the seam therebetween by a suitable adhesive, ultrasonic welding, or other suitable methods.

A combination fuel overflow restrictor and device 70 for preventing water and other foreign material from entering the fuel tank through the vent line is shown in FIGS. 7 through 17. A marine fuel system 72 employing the combination device 70 is shown in FIG. 7. The system includes a conventional fuel tank 12, filling line 14, fuel cap 18, and fuel vent line 16. The combination device 70 is installed on and supported by hull wall 11.

Figures 9, 10, 11:
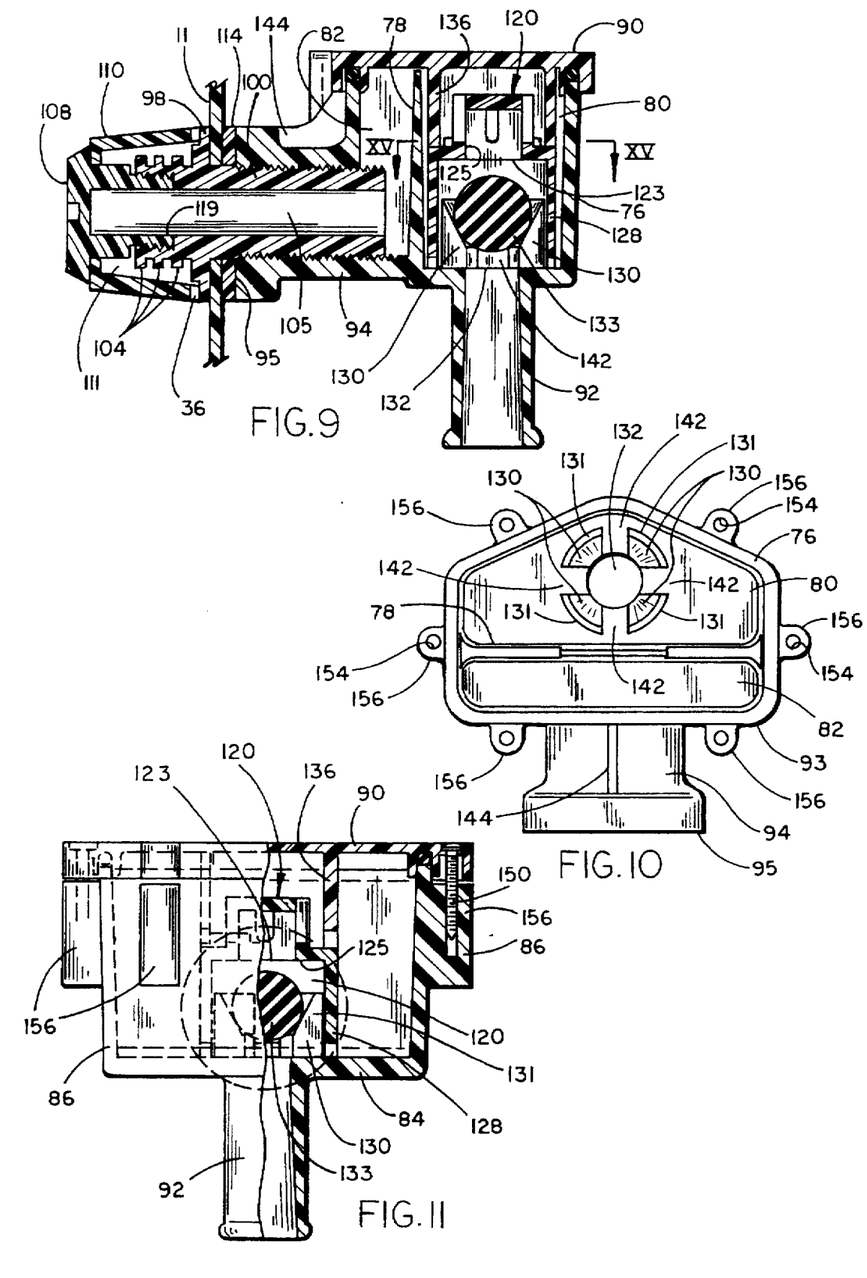
FIG. 9 is a side elevational, cross-sectional view of the device shown in FIG. 8.
FIG. 10 is a top plan view along lines X—X of FIG. 8 with the cap removed.
FIG. 11 is an inboard-side front elevational, partial cross-sectional view of the device shown in FIG. 8.

The combination fuel overflow and water intake restrictor 70 includes a housing 76 having a vertical partition 78 which divides the housing interior into two substantially separate compartments 80, 82. Vertical partition 78 is preferably formed integrally with the housing 76 with the bottom and side edges being in continuous engagement with the bottom 84 and side walls 86 of the housing so that, when cap 90 is in place, fluid communication between the inboard compartment 80 and outboard compartment 82 is limited to a pair of narrow gaps 88 formed at the top edge of the partition 78. Partition 78, thus, normally prevents liquids from flowing between the inboard compartment 80 and outboard compartment 82, but allows air and fuel vapors to pass freely therebetween through the two narrow gaps 88 between the top of the partition and cap 90 of combination device 70. Housing 76 includes an internal tubular inlet 92 to the bottom of the inboard compartment 80, which inlet is adapted to be connected with a vent hose/conduit means 16 in fluid communication with the headspace of the fuel tank 12. An internally threaded tubular outlet 94 through the outboard sidewall 93 of the housing provides fluid communication between the outboard compartment 82 and the surrounding atmosphere. Outlet 94 is preferably positioned near the bottom of the outboard compartment 82 to allow liquid to drain therefrom. Outlet 94 is also provided with a flange 95 to facilitate mounting of the device 70 directly onto and against the inner surface of hull 11.

A water intake restrainer 96 is adapted for mating, threaded engagement with outlet 94 and includes a central flange 98 adapted to abut the outer surface of hull 11, an externally threaded inboard end 100 adapted to extend through hull 11 and engage the internal threads 102 of outlet 94, and a plurality of radial flanges 104 outboard of the central flange. A bore or passageway 105 extends axially through restrainer 96 and the outboard end of passageway 105 includes internal threads 106 for receiving a trim cover retainer 108. Restrainer 96 also includes a frustoconical shaped trim cover 110 having a frustoconical shaped opening 111 passing axially therethrough. Trim cover 110 has a plurality of spaced vent openings 112 at its base through which air and fuel vapor pass to provide for atmospheric pressure equalization in the fuel tank 12, as will be explained herein after. A washer 114 is employed to provide a seal around the hull opening through which the threaded end 100 of the restrainer 96 passes.

The combination overflow restrictor and water restrainer device 70 is generally mounted directly onto and supported by the hull wall of a marine craft by passing the threaded end of the restrainer 100 from the outside of a marine craft through an appropriate vent opening in the hull and threading it into the outlet 94 of the housing 76 located on the inside of the marine craft at the vent opening in the hull, with the washer 114 located between the inner surface of the hull wall and the flange 96. Trim cover 110 is then fitted over the radial flanges 104 at the outboard end of the restrainer 96, and retainer 108, which also acts as a plug to close off the outboard opening 116 of trim cover 110, is then screwed into the outboard end of the restrainer 96. Any water splashed against the outboard portions of the combination device 70 is required to pass through the openings 112 in the base of the trim cover 110, through a passageway 111 between the inner walls of the trim cover and the outboard end of the restrainer 96 and past the radial flanges 104 which serve as impediments to liquid flow, into a radial opening 118 in the trim cover retainer 108 which is in fluid communication with an axial passageway 119 extending in an inboard direction from the slotted opening 118, through the axially extending passageway 119 at the restrainer 96, and into the outboard compartment 82 in the housing 76. A better understanding of the water intake restrainer 96 can be had by referring to commonly owned U.S. Pat. No. 4,877,152, which has been incorporated by reference herein.

Combination device 70 includes a ball check 133 and baffle plate member or assembly 120 which are similar in design to that of the previously described fuel overflow restrictor 22. Specifically, baffle plate member 120 includes a lower annular shaped baffle plate 122 having a central opening 123 and an upper, circular shaped baffle plate 124 which are maintained in spaced, parallel, concentric relationship by a slotted cylindrical wall 126. Baffle plate member 120, however, differs from that of the previous embodiment by having a hollow cylinder 128, which extends downwardly from the outer rim of lower annular shaped baffle plate 122. As best seen in FIGS. 10 and 11, the bottom wall 84 of housing 76 includes a plurality of inclined seat segments 130 which are circumferentially spaced about an inlet opening 132 to define spaces or openings 142. The seat segments serve a dual function of providing a lower seat upon which ball check 133 normally rests above and in axial alignment with inlet 92 and of providing means for positioning and securing baffle member 120 to bottom wall 84 with the lower edges of cylindrical wall 128 being in substantially fluid-tight abutment with the bottom wall 84 of the housing 76. Preferably housing 76 and baffle member 120 are each made of a thermoplastic material. Baffle member 120 is secured over the outward circumferential surfaces 131 of the seat segments 130 (FIGS. 10 and 11) by a frictional interference fit. The ball check 133 is trapped within the substantially cylindrical shaped volume defined by the seat segments 130, the lower baffle plate 122, and the cylindrical wall 128, and is free to move therein between the normal rest position on the seat segments 130 and an upper seat defined by the inner rim 125 of lower annular shaped baffle plate 122. At the lower circumferential edge of the cylindrical wall 128 of the baffle plate member 120 are one or more notches 134 through which fluid can pass from between the cylindrical volume of the inboard compartment 80 bounded by the cylindrical wall 120, and the remaining volume external to the cylindrical wall. Notches 134 are preferably radially aligned with spaces 142 between seat segments 130. The device 70 is closed off between inlet 92 and outlet 94 by cap 90, which includes a downwardly projecting cylindrical splash guard and baffle retainer 136, which is concentric with and spaced from the slotted cylindrical wall 126 of the baffle member 120. The splash guard/retainer 136 (best illustrated in FIGS. 15 through 17) has a plurality of downwardly projecting tabs 138 which define circumferential spaces 139 therebetween. Each tab 138 corresponds with one of a plurality of slots 140 in the slotted cylindrical wall 126 of the baffle plate member 120. Splash guard/retainer 136 prevents any liquid fuel which flows from the fuel tank past the baffles and out of the slots 140 from splashing upward over the partition 78 and into the outboard compartment 82 from which it could ultimately be discharged overboard into the environment. However, any such fuel can seep or flow slowly out of spaces 139 and down into compartment 80 where it returns to inlet 92 via notches 134 and spaces 142 between ball seat segments 130. Splash guard/retainer 136 also engages the top surface of lower baffle plate member 122 to hold baffle member 120 in place over seat segments 130.

Combination device 70 operates in a manner generally similar to the operation of the previously described fuel overflow restrictor, with the major difference being that a water intake restrainer has been integrated into the assembly. During normal operation when liquid fuel is not present in the vent line 16, air and fuel vapor are free to pass a tortuous passageway, i.e., upwardly through inlet 92, opening 132, around ball check 133, through the spaces 142 between the seat segments 130, upwardly through the cylindrical volume internal to wall 128 of the baffle plate member 120, upwardly through central opening 123 of lower annular shaped baffle plate 122, out of the slots 140 and into inboard compartment 80 of housing 76. The air and vapor can then flow freely over the gaps 88 of partition 78 and into the outboard compartment 82, through outlet 94, through axial passageway 105 into coaxial passageway 119 in trim cover retainer 108 which is in fluid communication with radial opening 118, out of radial opening 118, through the space 111 between the exterior of the outboard end of the water intake restrainer and the interior of the trim cover 110, and finally out of the vent openings 112. Air can also flow into the fuel tank 12 following a reverse tortuous flow path of that described above to allow pressure equalization in the fuel tank when fuel is being withdrawn to power the engine.

Figures 12, 13, 14, 15, 16, 17:
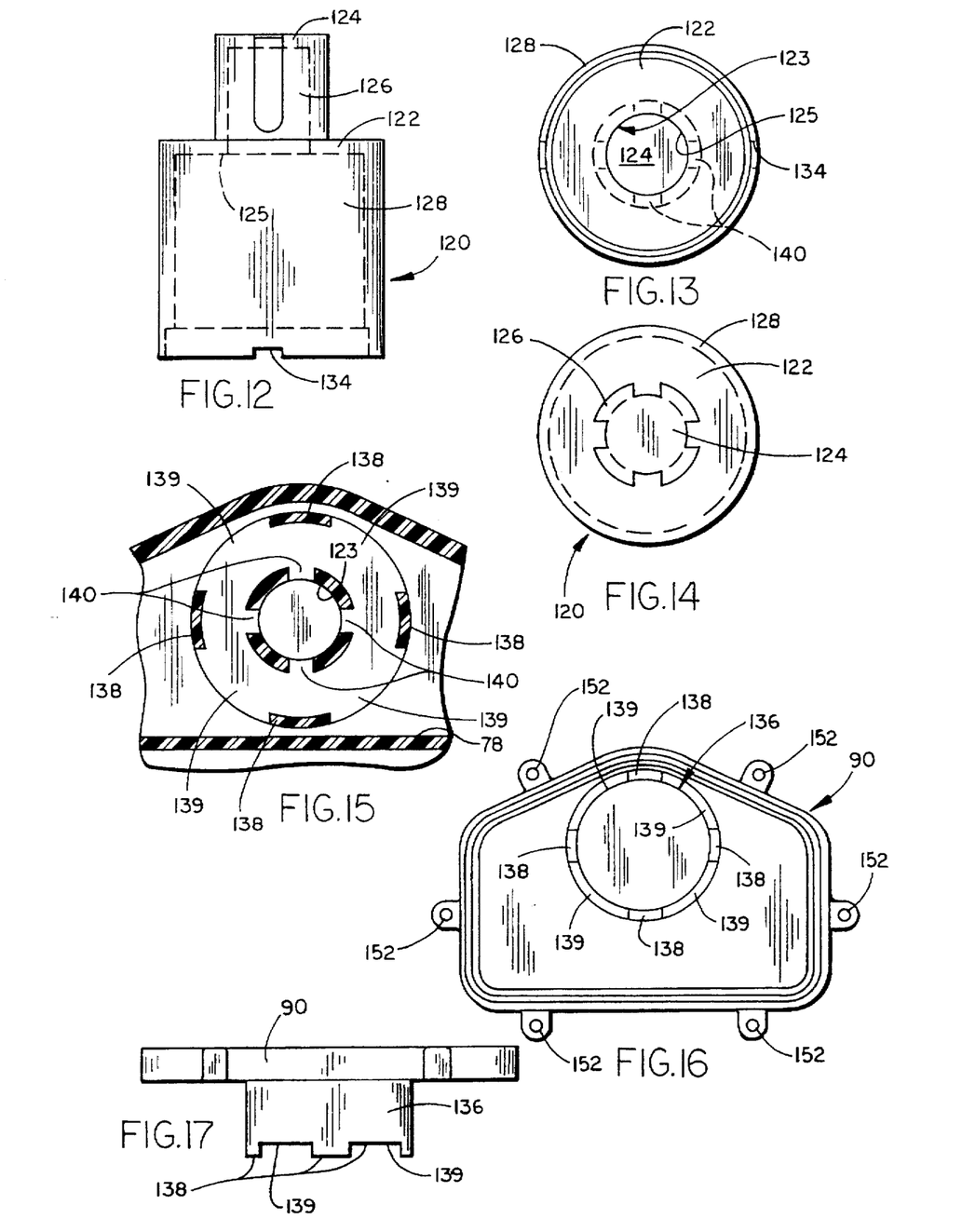
FIG. 12 is a side elevational view of the baffle plate member for the combined fuel surge restrictor and water intake restraining device shown in FIG. 8.
FIG. 13 is a bottom view of the baffle plate member shown in FIG. 12.
FIG. 14 is a top plan view of the baffle plate member shown in FIG. 12.
FIG. 15 is a cross-sectional view along lines XV—XV of FIG. 9.
FIG. 16 is a bottom view of the cap for the combined fuel surge restrictor and water intake restraining device shown in FIG. 8.
FIG. 17 is a side elevational view of the cap shown in FIG. 16.

In the event of a liquid fuel surge, device 70 is effective at arresting the surge to prevent liquid fuel from being discharged into the environment, while providing continuous venting and pressure relief. As a surge of fuel, due for example to overfilling or rocking on account of wave action, rushes up vent line 16 from fuel tank 12 into inlet 92 of device 70, it impinges on ball check 133 transferring upward momentum thereto and causing it to rise and seat up against rim 125 of central opening 123 of lower annular baffle plate 122, substantially blocking the flow of liquid through device 70. Liquid fuel which passes upward through the central opening 123 before the ball check 133 seats up against rim 125 thereof loses considerable upward momentum by impinging on and flowing around the ball check 133 and by impinging on the lower annular baffle plate. Substantially all of any remaining upward momentum is lost when the liquid fuel impinges upon upper baffle plate 124. Slots 140 on cylindrical wall 126 of the baffle plate member 120 are preferably oriented so that they face outwardly toward the downwardly projecting tabs 138 on the splash guard 136 (as best illustrated in FIG. 15) so that any liquid which exits the slots 140 must impinge on the tabs 138 and be directed downwardly to the bottom of the inboard compartment 80 through spaces 139. Notches 134 at the bottom edge of the cylindrical wall 128 of the baffle plate member allow highly restricted flow of liquid and vapor from the fuel tank 12 into the inboard compartment to provide continuous pressure relief and atmospheric pressure equalization in the fuel tank, while ball check 133 is seated against rim 125 of central opening 123 in annular baffle plate 122. Notches 134 also serve an important secondary function of allowing any liquid fuel which has accumulated in the inboard compartment 80 to flow back into the volume bounded by the cylindrical wall 128, downward and out through openings 142, opening 132, outlet 92, vent line 16, and back into the fuel tank 12. In the unlikely event of further fuel pressure or surge, and in the event fuel fills compartment 80, fuel will still be trapped within device 70 even if it flows over partition 78 where it is held in outboard compartment 82. Likewise, any water entering through openings 112 through the tortuous passageway described above will be retained and held in outboard compartment 82 to avoid back flow into fuel tank 12.

As with the previously described overflow restrictor 22, the inboard portions of device 70, including housing 76, baffle member 120, and cap 90 are preferably formed from a thermoplastic material such as polypropolene 20% glass filled. The ball check is preferably formed of a resilient elastomeric material. The inlet 92, outlet 94, flange 95, partition 78, and seat segment 132, as well as a outlet stiffening member 144 are preferably integrally formed with the housing 76 such as by compression or injection molding. Likewise, the baffle member 120, including lower and upper baffles 122, 124 and cylindrical walls 126, 128 are preferably formed as a unit such as by compression or injection molding. Similarly, the splash guard/retainer 136 is integrally formed with cap 90 such as by compression or injection molding. Ball check 133 can be made from a variety of different materials and can be hollow, solid, or filled, and can be either buoyant or non-buoyant. Most preferably ball check 133 is non-buoyant (i.e., has an apparent density in excess of the density of the liquid fuel) and is made of a solid elastomeric material such as nitrite rubber.

Assembly of the inboard portion of device 70, which is best understood with reference to FIG. 8, is achieved by positioning the ball check 133 on the seat segments 130, securing baffle plate member 120 over ball check 133 and onto the seat segments 130 so that the bottom edge of wall 128 is in continuous liquid-tight engagement with bottom 84 of housing 76. Cap 90 is then secured, such as with threaded fasteners 150 which pass through apertures 152 in cap 90 and are received in threaded bores 154 of bosses 156 formed on the outer wall of housing 76 to the upper edges of the housing 76 to provide a liquid-tight seal and simultaneously engage and hold baffle member 120 in place via splash guard/retainer 136 and tabs 138.

The foregoing description and drawings are merely illustrative, it being understood that the invention is not limited to the disclosed embodiments, but is intended to embrace all alternatives, equivalents, modifications and rearrangements of the elements falling within the scope of the invention as defined by the claims.

It will be understood by those who practice the invention and by those skilled in the art, that various modifications and improvements may be made to the invention without departing from the spirit of the disclosed concept. The scope of protection afforded is to be determined by the following claims and by the breadth of interpretation allowed by law.

The embodiments of the invention in which an exclusive property or privilege is claimed are defined as follows:

1. A surge restrictor for preventing liquid fuel from discharging from a fuel vent line of a motorized vehicle, comprising:

a housing defining an interior chamber;

a tubular inlet to said interior chamber which is adapted to be connected with conduit in fluid communication with a headspace of a fuel tank;

a tubular outlet from said interior chamber which is adapted to be connected with a conduit in fluid communication with an ambient atmosphere;

a baffle member including a liquid flow diverting surface disposed within said chamber which causes liquid flowing from said inlet to said outlet to change direction, whereby momentum of the liquid is dissipated, said baffle member including a lower annular shaped baffle plate having a central opening through which fluid flows, and an upper generally circular shaped baffle plate, said baffle plates being integral portions of said baffle member and being maintained in spaced relationship by a slotted cylindrical wall; and a movable closure member which in response to a surge of liquid into said inlet restricts the flow of liquid through said surge restrictor said movable closure member being movable between a first position wherein fluid flowing into said inlet of said surge restrictor impinges upon and freely flows past said movable closure member and through a passageway between said inlet and said outlet and a second position wherein said movable closure member blocks said passageway to abate fluid flow through said surge restrictor said passageway including an opening in said baffle member which is blocked by said movable closure member when said movable closure member is in said second position.

2. The surge restrictor of claim 1, wherein said movable closure member is a ball check, and said surge restrictor further comprises means for guiding the ball check between said first and second positions.

3. The surge restrictor of claim 1, wherein said baffle member further comprises at least one orifice allowing restricted fluid flow therethrough when said movable closure member is in said second place.

4. The surge restrictor of claim 1, further comprising means for allowing restricted fluid flow therethrough when said movable closure member is in said second position.

5. A surge restrictor for use in a fuel tank vent line of a marine craft to prevent liquid fuel from being discharged into the environment through the fuel tank vent line, while allowing continuous venting and atmospheric pressure equalization of the fuel tank, comprising:

a housing defining an interior chamber;

a tubular inlet to said interior chamber which is adapted to be connected with conduit in fluid communication with a headspace of a fuel tank;

a tubular outlet from said interior chamber which is adapted to be connected with conduit in fluid communication with an ambient atmosphere;

a baffle member including a liquid flow diverting surface disposed within said chamber which causes liquid flowing from said inlet to said outlet to change direction, whereby momentum of the liquid flowing is dissipated;

a closure member which is not buoyant in the liquid fuel entering said inlet and which is movable between a first position wherein fluid flowing into the inlet of said surge restrictor impinges upon and flows around said closure member and through an opening in said baffle member, and a second position wherein said closure member blocks said opening to abate fluid flow through said surge restrictor; and an aperture allowing restricted fluid flow through said flow restrictor when said closure member is in said second position.

6. The surge restrictor of claim 5, wherein said closure member is a ball check, and said surge restrictor further comprises means for guiding the ball check between said first and second positions.

7. The surge restrictor of claim 6, wherein said aperture for allowing restricted fluid flow through said flow restrictor when said closure member is in said second position is comprised of at least one orifice in said baffle member having said opening.

8. The surge restrictor of claim 6, wherein said baffle member includes a lower annular shaped baffle plate having a central opening through which fluid flows when said ball check is in said first position, and an upper generally circular shaped baffle plate, said baffle plates being integral portions of said baffle member and being maintained in spaced relationship by a slotted cylindrical wall.

9. The surge restrictor of claim 8, wherein said check ball is seated against an inner rim of said central opening to prevent flow therethrough when said ball check is in said second position.

10. The surge restrictor of claim 8, wherein said housing and said baffle member are formed of a thermoplastic material.

11. The surge restrictor of claim 8, wherein said chamber is substantially cylindrical, and wherein said inlet and said outlet are substantially aligned.

12. The surge restrictor of claim 5, wherein said closure member has an apparent density of from about 1.1 to about 1.3 times the density of the liquid fuel.

13. The surge restrictor of claim 5, wherein said interior chamber is divided into an inboard subchamber and an outboard subchamber separated by a substantially vertical partition which limits fluid communication between said inboard and outboard subchambers to a gap between the upper edges of said partition and an upper wall of said chamber, said baffle member being disposed within said inboard chamber above said inlet, and said outlet being in fluid communication with the bottom of said outboard chamber to allow liquids to drain therefrom.

14. The surge restrictor of claim 13, wherein said outlet is adapted to be mounted on the interior side of a hull wall of a marine craft and joined to a device for restraining the flow of water and preventing other materials from entering the fuel vent line.

15. The surge restrictor of claim 14, wherein said water flow restraining device is adapted to be mounted on the exterior side of a hull wall of a marine craft by joining said water flow restraining device to said outlet of said surge restrictor.

16. A fuel vent system for preventing liquid from discharging from the fuel vent line of a marine craft and for preventing water and other contaminants from entering a fuel tank of the marine craft through the fuel vent line, comprising:

a surge restrictor for preventing liquid fuel from passing therethrough, said surge restrictor including a housing defining an interior chamber, a tubular inlet to said interior chamber, a tubular outlet from said interior chamber, a baffle member including a liquid flow diverting surface disposed within a flow path through said interior chamber such that fluid passing therethrough impinges upon said baffle member and is redirected to dissipate momentum of said fluid, and a movable closure member which in response to a surge of liquid in said inlet abates the flow of liquid through said surge restrictor;

conduit means in fluid communication with a headspace of a fuel tank and with said inlet of said surge restrictor; and a water flow restraining device having an inlet in fluid communication with said outlet of said surge restrictor, and an outlet in fluid communication with an ambient atmosphere;

said movable closure member being a ball check which is movable between a first position wherein fluid flowing into said inlet of said surge restrictor impinges upon and flows around said check ball and through a passageway in a flow path between said inlet and said outlet of said surge restrictor, and a second position wherein said ball check blocks said passageway to abate fluid flow through said surge restrictor;

said baffle member including a lower annular shaped baffle plate having a central opening through which fluid flows when said ball check is in said first position and an upper generally circular shaped baffle plate, wherein said baffle plates are integral portions of a top-hat shaped baffle member wherein the lower and upper baffles are maintained in space parallel concentric relationship by a slotted cylindrical wall.

17. The fuel vent system of claim 16, wherein a hollow cylinder extends downwardly from the outer rim of the lower baffle plate, and lower edges of said cylinder are in fluid-tight contact with a bottom wall of said housing.

18. The fuel vent system of claim 17, wherein said interior chamber is divided into an inboard subchamber and an outboard subchamber separated by a substantially vertical partition which limits fluid communication between said inboard and outboard subchambers to a gap between upper edges of said partition and an upper wall of said chamber, said baffle member being disposed within said inboard chamber above said inlet, and said outlet being in fluid communication with the bottom of said outboard chamber to allow liquids to drain therefrom.

19. The fuel vent system of claim 18, wherein said outlet from said interior chamber is adapted to be mounted on the interior side of a hull wall of a marine craft and said water flow restraining device is adapted to be mounted on the exterior side of the hull wall of the marine craft by joining said water flow restraining device to said outlet of said surge restrictor.

20. The fuel vent system of claim 19, wherein said lower edges of said cylinder includes at least one notch through which fluid can pass from between the interior and exterior thereof.

21. A surge restrictor for preventing liquid fuel from discharging from a fuel vent line of a motorized vehicle, comprising:

a housing defining an interior chamber;

an inlet to said interior chamber which is adapted to be connected with a conduit in fluid communication with the head space of a fuel tank;

an outlet from said interior chamber which is adapted to be connected with a conduit in fluid communication with an ambient atmosphere;

a closure member which is movable between a first position wherein fluid flowing into said inlet of said surge restrictor impinges upon and freely flows past said closure member and through a passageway between said inlet and said outlet, and a second position wherein said closure member blocks said passageway to abate fluid flow through said surge restrictor; and a baffle member including a lower annular shaped baffle plate having an opening through which fluid flows when said closure is in said first position, and an upper generally circular shaped baffle plate, said baffle plates being integral portions of said baffle member and being maintained in spaced relationship by a slotted cylindrical wall.

22. The surge restrictor of claim 21, at least one orifice in said baffle member for allowing restricted fluid flow through said flow restrictor when said closure member is in said second position.

* * * * *

UNITED STATES PATENT AND TRADEMARK OFFICE
CERTIFICATE OF CORRECTION

PATENT NO. : 5,762,093
DATED : June 9, 1998
INVENTOR(S) : Warwick M. Whitley, 11

It is certified that error appears in the above-identified patent and that said Letters Patent is hereby corrected as shown below:

Column 11, Line 3;
"nitrite" should be --nitrile--.

Column 12, Claim 3, Line 6;
"place" should be --position--.

Signed and Sealed this

Eighth Day of December, 1998

Attest:

BRUCE LEHMAN

Attesting Officer

Commissioner of Patents and Trademarks